United States Patent
Harder et al.

(10) Patent No.: US 7,668,374 B2
(45) Date of Patent: Feb. 23, 2010

(54) METHOD FOR SUPPORTING LOW-LEVEL FLIGHTS

(75) Inventors: Harald Harder, Salem-Buggensegal (DE); Matthias Wegner, Friedrichschafen (DE); Michael Hoyer, Heiligenberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 677 days.

(21) Appl. No.: 11/537,336

(22) Filed: Sep. 29, 2006

(65) Prior Publication Data

US 2007/0086657 A1 Apr. 19, 2007

(30) Foreign Application Priority Data

Oct. 1, 2005 (DE) ................. 10 2005 047 273

(51) Int. Cl.
| | |
|---|---|
| G06K 9/00 | (2006.01) |
| G01S 13/00 | (2006.01) |
| G08B 23/00 | (2006.01) |
| G01C 5/00 | (2006.01) |

(52) U.S. Cl. ................. 382/181; 382/106; 342/29; 340/963; 701/9; 701/301

(58) Field of Classification Search .......... None
See application file for complete search history.

(56) References Cited

U.S. PATENT DOCUMENTS

| | | | |
|---|---|---|---|
| 5,359,403 A | 10/1994 | Grosmann et al. | |
| 6,243,482 B1 | 6/2001 | Eibert et al. | |
| 6,747,576 B2 | 6/2004 | Schaefer | |
| 2002/0153485 A1 * | 10/2002 | Nixon et al. | ............ 250/330 |
| 2003/0043058 A1 * | 3/2003 | Jamieson et al. | ............ 340/961 |
| 2005/0109872 A1 * | 5/2005 | Voos et al. | ............ 244/3.17 |
| 2007/0221849 A1 * | 9/2007 | Tabirian et al. | ............ 250/341.1 |

FOREIGN PATENT DOCUMENTS

| | | |
|---|---|---|
| DE | 196 05 218 C1 | 4/1997 |
| DE | 198 28 318 A1 | 1/2000 |
| DE | 100 55 572 C1 | 1/2002 |
| EP | 0 562 941 A1 | 9/1992 |
| FR | 2 258 637 A1 | 8/1975 |
| GB | 1 494 561 | 12/1977 |
| GB | 2 341 506 A | 3/2000 |

* cited by examiner

Primary Examiner—Charles Kim
(74) Attorney, Agent, or Firm—Greenblum & Bernstein P.L.C.

(57) ABSTRACT

A method for supporting low-level aircraft flights in which a warning is provided for the pilot upon a reliable recognition of wire-like obstacles, even during extreme environmental influences, such as clutter, or even when such obstacles are seen against the sky. The method is performed upon the collection of information on the topography of the surrounding terrain by at least one sensor located on the aircraft, such information representing raw data, based upon which an image-like representation is calculated, such representation including a pixel quantity with pixels P(i, j) in columns j and lines i, which image-like representation is evaluated by calculating altitude values in a geodetic coordinate system using the flight condition from the aircraft, evaluating pixel quantity by comparing each pixel P(l, j) to threshold values or ranges of values, evaluating the image-like representation and highlighting each pixel as a picture element if any of various cases is present.

5 Claims, 4 Drawing Sheets

METHOD FOR SUPPORTING LOW-LEVEL FLIGHTS

CROSS-REFERENCE TO RELATED APPLICATION

This application claims priority under 35 U.S.C. §119 of German Patent Application No. 10 2005 047 273.7-22, filed on Oct. 1, 2005, the disclosure of which is hereby incorporated by reference herein in its entirety.

BACKGROUND OF THE INVENTION

1. Field of the Invention

The invention relates to a method for supporting low-level flights in which an obstacle warning is provided for the pilot, whereby information on the topography of the surrounding terrain is collected by at least one sensor located on the aircraft, whereby the information represents raw data, and whereby an image-like representation is calculated from the overall raw data.

2. Description of Background and Relevant Information

Overhead lines and wires can constitute a significant hazard to low-flying aircraft such as helicopters, for example, due to the operational spectrum of applications, i.e., the wide range of applications in which such aircraft are called-upon to operate. In contrast with relatively large solid obstacles, such as, e.g., mountainsides or valley walls, large buildings, edges of forests, or dense groups of trees, there are other obstacles, particularly overhead lines, i.e., cables and wires, e.g., which characterized by their very low visual contrast to their surroundings. This can mean that pilots of such aircraft risk not recognizing such line obstacles until very late, giving rise to critical flight situations.

Sensors based upon laser scanning or imaging radar technology can provide obstacle information in the form of distance images, i.e., image matrices of distance measurement pixels. The problem lies in the development of a method for recognizing lines or line pixels in these distance images that can be performed in real time so that the pilot can be adequately warned about such objects in a targeted manner.

Methods for recognizing lines, such as cables or wires, by means of the Hough transform are known from DE 100 55 572 C2 and U.S. Pat. No. 6,747,576 B2. These methods are aimed at recognizing the line as an entire object and are correspondingly complex and time-intensive in terms of computing. The capacity of conventional processors is too small to carry out the calculations of these methods in real time.

Other methods recognize line pixels solely by searching for sudden changes in the distance value of a pixel compared with those adjacent to it within the column in the distance image. A method of this type is known from DE 198 28 318 C2 and UK Patent Application Publication No. 2 341 506 A. Since it must also be possible to recognize lines when seen against the sky—where there are no valid distance measurement values—a pixel must also be classified as a line pixel when it is surrounded in the column by adjacent pixels with invalid distance values. However, invalid measurement pixels do not occur only when the sensor faces towards the sky, they also occur sporadically, through solar radiation and particularly often through reflections on smooth surfaces, such as, e.g., bodies of water, asphalt streets and squares, take-off or landing runways or helicopter landing airfields. With the method according to DE 198 28 318 C2 these invalid measurement pixels lead to incorrect interpretations of measurement pixels as line pixels, the accumulation of which in particular in the area of take-off and landing runways or with bodies of water considerably restricts the reliability of this method. This has negative effects on the operational applicability in an obstacle warning system for low-flying aircraft.

SUMMARY OF THE INVENTION

The invention provides a further development of a generic method for supporting low-level flights such that wire-like obstacles are reliably recognized even with severe environmental influences such as clutter, e.g., or when seen against the sky.

More particularly, the invention comprises a very reliable method for recognizing line and wire pixels, with which it is not necessary to recognize the line or the wire as an entire object. The method is therefore extremely efficient in terms of computing time.

According to the invention the method includes the following:

Calculation of the altitude values $h(i, j)$ of the individual pixels $P(i, j)$ in a geodetic coordinate system using the flight condition data of the aircraft;

Evaluation of the pixel quantity, whereby for each pixel $P(i, j)$ the distance value is compared to a predetermined threshold value or threshold value range and the pixel $P(i, j)$ is given an invalid status if the corresponding distance value is above the threshold value or outside the threshold value range;

Definition in each pixel column j for each pixel $P(i, j)$ of a reference altitude $h_{ref}$ with $h_{ref}=\text{Min}(h_{above}, h_{below})$, where $h_{above}$ is the altitude value of that pixel $P(i', j)$ with valid status in the respective pixel column j above the measurement pixel $P(i, j)$, which is nearest to the measurement pixel $P(i, j)$ and $h_{below}$ is the altitude value of that pixel $P(i'', j)$ with valid status in the respective pixel column j below the measurement pixel $P(i, j)$ which is closest to the measurement pixel $P(i, j)$;

Evaluation of the image-like representation, whereby the distance values of pixels $P(i, j)$ adjacent in the vertical direction are compared in each pixel column j of the image-like representation from the top to the bottom or vice versa and the corresponding pixel $P(i, j)$ is highlighted as a picture element if at least one of the following cases a) through c) is present:

a. the condition $(Rg_{i-1,j} - Rg_{i,j}) > dRg_{min}$ and $(Rg_{i+1,j} - Rg_{i,j}) > dRg_{min}$ is fulfilled, b. the condition is fulfilled that pixel $P(i-1,j)$ is invalid and $(Rg_{i+1,j} - Rg_{i,j}) > dRg_{min}$, c. the condition is fulfilled that the adjacent pixels $P(i-1, j)$ above the measurement pixel $P(i, j)$ and the adjacent pixels $P(i+1, j)$ below the measurement pixel $P(i, j)$ have an invalid status and the altitude value $h(i, j)$ of the measurement pixel $P(i, j)$ is greater than the reference altitude $h_{ref}$, where the value $dRg_{min}$ is dependent on the resolution of the sensor used, $Rg_{i,j}$ is the distance value to the measurement pixel $P(i, j)$ and $Rg_{i-1,j}$ and $Rg_{i+1,j}$ are the distance values of the directly adjacent pixels $P(i-1, j)$ and $P(i+1, j)$ in the column j of the distance image.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, with reference to the attached drawings, which disclose by way of non-limiting examples, various exemplary embodiments of the invention, in which like reference numerals represent similar parts throughout the several views of the drawings, and wherein.

DETAILED DESCRIPTION OF THE INVENTION

Figure 1:
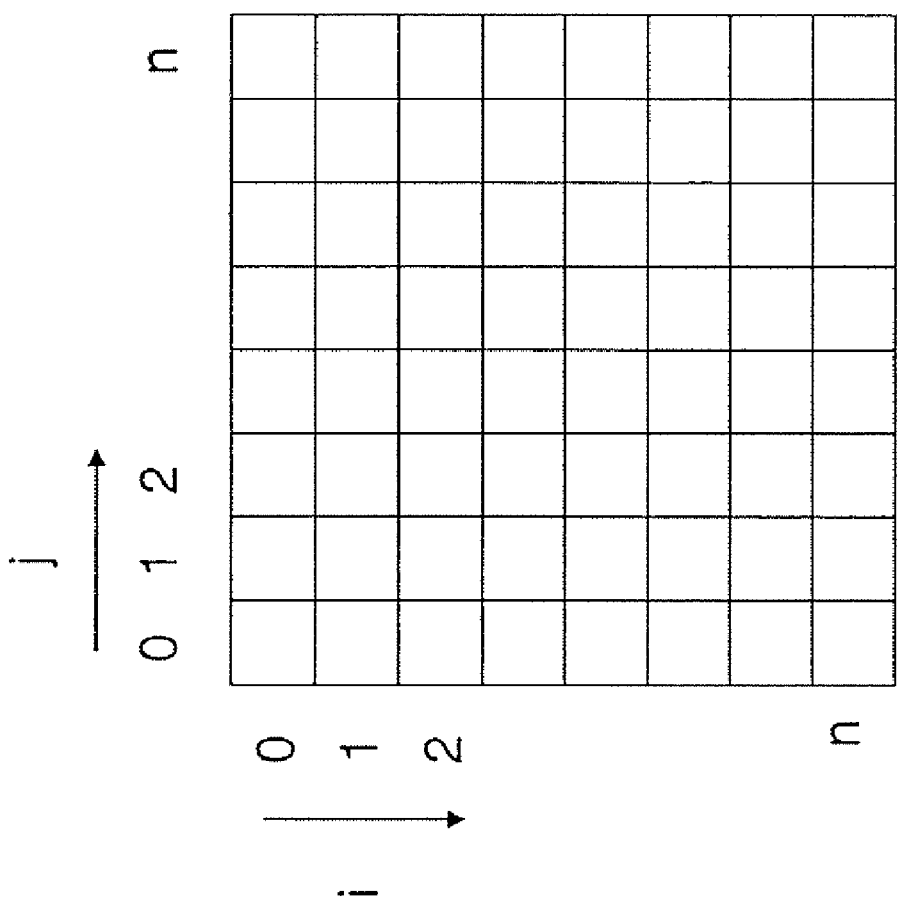
FIG. 1 illustrates a diagrammatic structure of a distance image.

The particulars disclosed herein are by way of example and for purposes of illustrative discussion of exemplary embodiments of the invention only and are presented for the purpose of providing what is believed to be a useful and readily understood description of principles and aspects of the invention. In this regard, details of the invention that are presented herein are intended to provide a fundamental understanding of the invention, the description taken with the drawings making apparent to those skilled in the art how the several forms of the invention may be embodied in practice.

Advantageously, not only directly adjacent individual pixels but also pairs and triples of directly adjacent pixels are observed in the distance image with regard to a measurement pixel, i.e., the conditions a)-c) are examined several times, whereby not only those directly adjacent, but also the next indirectly adjacent and the ones after that are observed as reference pixels. This approach can be used expediently when a line obstacle in the distance image is represented by two or more adjacent column pixels with correspondingly high line resolution. The desired reliability of the method regarding the misclassification of measurement pixels is achieved through the altitude condition in case c).

The method according to the invention is reliable yet efficient in terms of computing time for recognizing line and wire pixels from a distance image that in addition to the distance value of the measurement pixels also uses the altitude of the pixels in a geodetic coordinate system.

For the method according to the invention, first a collection of raw data according to known methods is necessary. For the wire recognition according to the invention, as raw data either directionally linked distance values must thereby be present which show an image of the topography surrounding the aircraft, or a preprocessed digital image must already be present in which a distance detected by the sensor can be unequivocally assigned to each picture element (pixel). The raw data can be obtained, e.g., by a radar or laser sensor. The relative location of each data point with respect to the location of the sensor at the measurement time t must be known, so that an image-like representation can be calculated from the overall data. This representation reproduces the sensor's "view" of the surroundings, whereby the distance to the detecting sensor is known for each picture element.

In the recognition of wire-like objects in real time, the preprocessed sensor image is evaluated. To this end, the distance values of adjacent picture elements in the vertical direction are compared in each pixel column from top to bottom (or vice versa). In the event that the distance value of a picture element is substantially less than that of the ones adjacent to it or the picture element is surrounded by invalid picture elements, i.e., that this distance value "stands out," the corresponding pixel is highlighted in a contrasting or signal color.

The method is thus based on a distance image matrix that was recorded by an active sensor on an aircraft, whereby the distance image sensor scans the surroundings of the aircraft lying in the direction of flight according to known methods. In a preprocessing, the position of the measurement pixels is calculated in a geodetic coordinate system, using the navigation or flight condition data of the aircraft. In a first process phase, through known filter methods (sun filter, drop in filter) invalid measurement pixels due to direct or indirect solar radiation (clutter) and due to measurement errors of the sensor (drop in pixels) can be identified and filtered out. Invalid measurement pixels can also occur through reflections on smooth surfaces, such as, e.g., with bodies of water, asphalt streets and squares, take-off and landing runways, or helicopter landing airfields.

Identifying line pixels is thus based on a distance image in which the following information is available for every measurement pixel:

distance from the aircraft
altitude in a geodetic coordinate system
status of validity.

The method examines the measurement pixels within a column j in the sensor image (FIG. 1). The sudden decrease of the distance value of a pixel compared to the closest adjacent pixels is used as a criterion for a line pixel. A sudden decrease of the distance value can also be present, however, when a measurement pixel is surrounded by two invalid measurement pixels. In this case, an infinite distance value can be assumed for an invalid measurement pixel.

First the following values are defined for a measurement pixel (i,j) in row i and column j of the sensor image:

$h_{above}$ is the altitude of that valid pixel (i', j) in the column j above pixel (i,j), i.e., i'<i, that is closest to the pixel (i,j).

$h_{below}$ is the altitude of that valid pixel (i',j) in the column j below pixel (i,j), i.e., i'>i, that is closest to the pixel (i,j).

The minimum of the two altitudes is defined as reference altitude $h_{ref} = \mathrm{Min}(h_{above}, h_{below})$.

A pixel (i,j) is classified as a line pixel precisely when at least one of the following cases a) through c) is present:

a) Distance values of the two adjacent pixels P(i−1, j) and P(i+1, j) of the column j are greater than the distance value of the measurement pixel P(i, j):

$$(Rg_{i-1}-Rg_{i,j}) > dRg_{min} \text{ and } (Rg_{i+1,j}-Rg_{i,j}) > dRg_{min}$$

b) The distance value of the lower adjacent pixel P(i+1, j) in the column j is greater than that of the measurement pixel P(i, j) and the upper adjacent pixel P(i−1,j) is invalid:

$$\text{Pixel } P(i-1,j) \text{ invalid and } (Rg_{i+1,j}-Rg_{i,j}) > dRg_{min}$$

c) Both adjacent pixels P(i−1, j) and P(i+1, j) are invalid and the measurement pixel lies above the reference altitude $h_{ref}$:

$$P(i-1,j) \text{ invalid and } P(i+1,j) \text{ invalid and } h(l,j) > h_{ref}$$

The value $dRg_{min}$ is a preset parameter that is dependent on the sensor and thus also on the angular resolution of the distance image. Expediently, the value $dRg_{min}$ is ≧5% of the distance value of the measurement pixel respectively to be examined.

Figure 2:
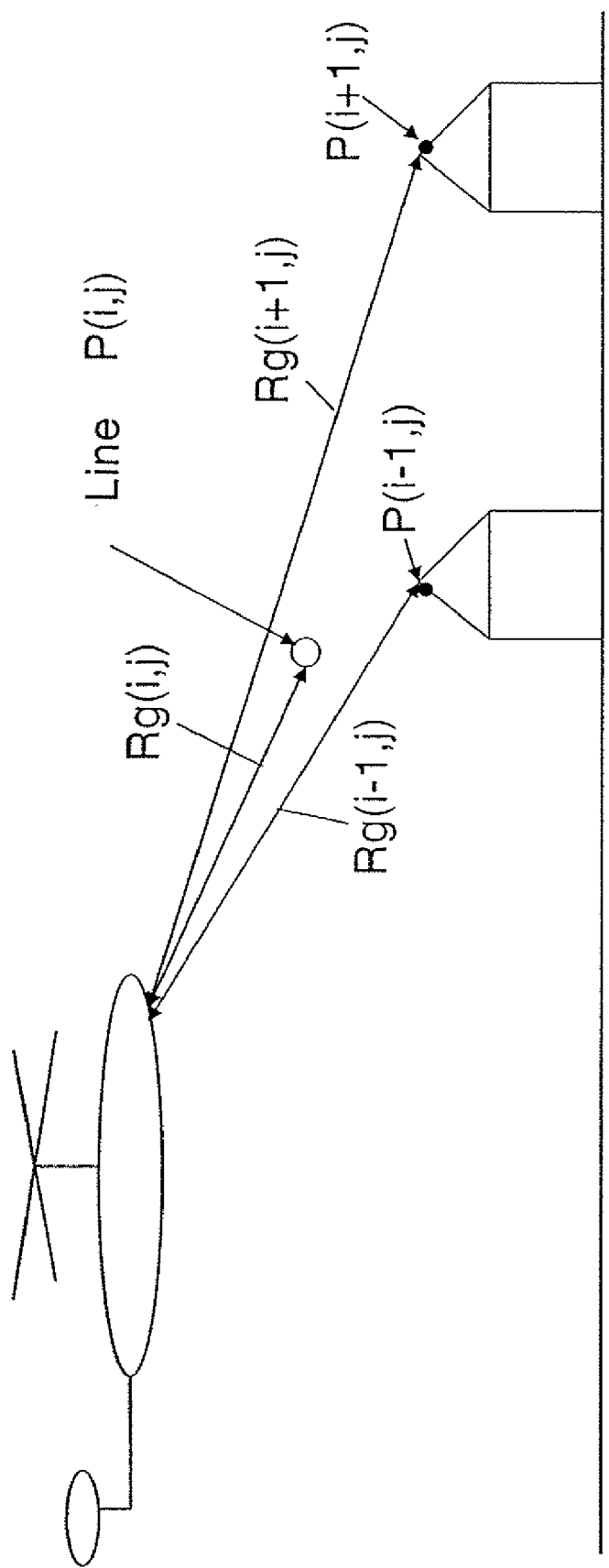
FIG. 2 is a first diagrammatic representation for recognizing a line pixel.

FIG. 2 thereby shows a first diagrammatic representation for recognizing a line pixel in accordance with case a). The respective distance value Rg(i−1,j) or Rg(i+1,j) of the adjacent pixels P(i−1, j) or P(i+1, j) in a sensor image (not shown) is respectively greater than the sum of the distance value Rg(i,j) of the measurement pixel P(i, j) and a preset parameter $dRg_{min}$. In this case, the sensor recognizes a line pixel, e.g., in front of a house facade or over an open field.

Figure 3:
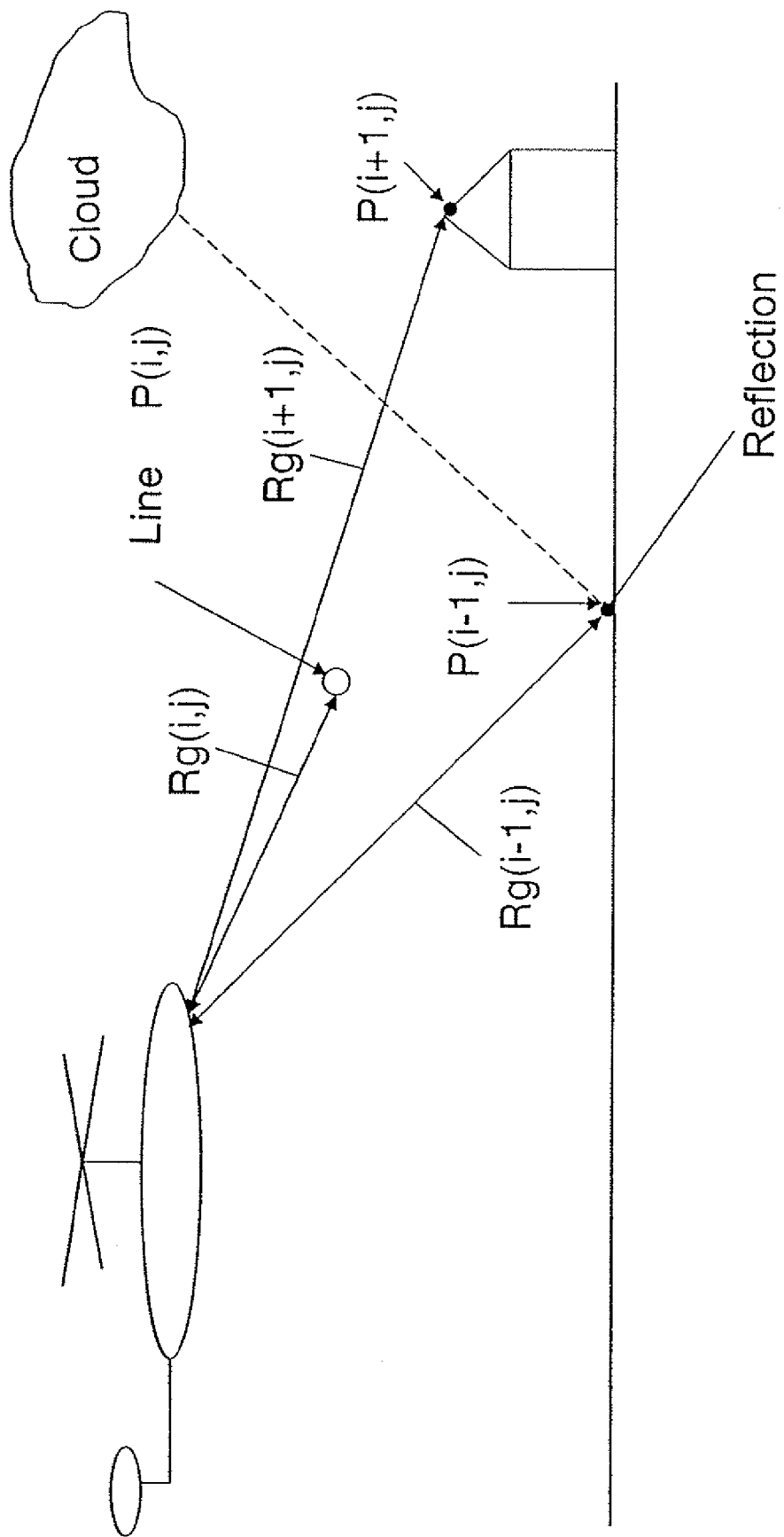
FIG. 3 is a second diagrammatic representation for recognizing a line pixel.

FIG. 3 shows a second diagrammatic representation for recognizing a line pixel in accordance with case b). The lower adjacent pixel P(i−1, j) is invalid, since no unequivocal distance value Rg(i−1,j) can be assigned to this pixel, and the distance value of the upper adjacent pixel P(i+1, j) greater than the sum of the distance value of the measurement pixel P(i, j) and a preset parameter $dRg_{min}$. The invalid measurement pixel hereby has an infinite distance value. In this case, the sensor recognizes a line over an airfield mirages.

Figure 4:
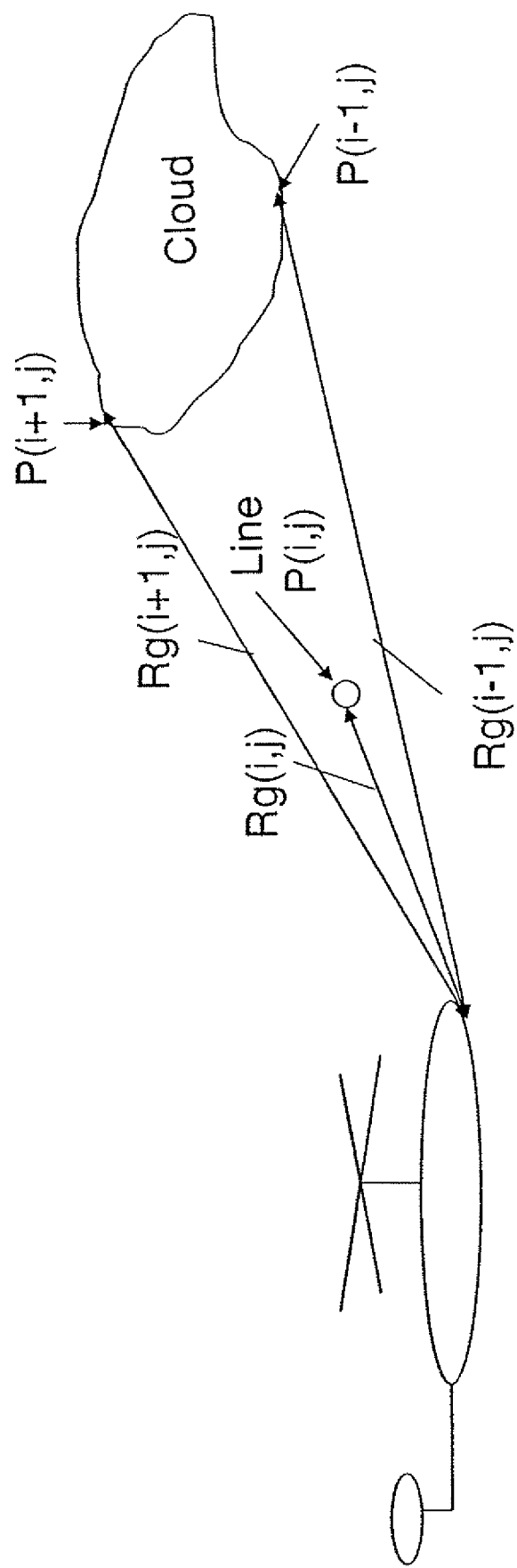
FIG. 4 is a third diagrammatic representation for recognizing a line pixel.

FIG. 4 shows a third diagrammatic representation for recognizing a line pixel in accordance with case c). The measurement pixel P(i,j) is surrounded by two invalid measurement pixels P(i+1,j) and P(i−1,j). The measurement pixels P(i+1,j) and P(i−1,j) have been classified as invalid, since no defined distance Rg(i+1,j) or Rg(i−1,j) can be assigned to the two measurement pixels. The invalid measurement pixels hereby respectively have an infinite distance value. In this case the sensor recognizes a line in a view against the sky.

The method according to the invention is able to recognize overhead lines and wires very reliably in distance images. Furthermore, it is simple and therefore markedly efficient in terms of computing time. Misclassifications due to invalid measurement pixels are drastically reduced, in particular through the altitude condition in the case c). Since invalid measurement pixels through reflections accumulate particularly in the area of take-off and landing runways, helicopter landing airfields or with bodies of water, in an obstacle warning system based on distance images for low-flying aircraft this leads to a considerable improvement of its reliability, a significant reduction in the false alarm rate and thus to an increase in its operational suitability and usability.

The foregoing examples have been provided merely for the purpose of explanation and are in no way to be construed as limiting of the present invention. While the present invention has been described with reference to an exemplary embodiment, it is to be understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein; rather, the present invention extends to all functionally equivalent structures, methods and uses, such as are within the scope of the appended claims.

The invention claimed is:

1. A method for supporting low-level flights in which an obstacle warning is provided for the pilot, whereby information on topography of surrounding terrain is collected by at least one sensor located on an aircraft, whereby the information represents raw data, and whereby an image-like representation is calculated from the raw data, whereby the image-like representation comprises a pixel quantity with pixels P(i, j) in columns j and lines i, the method comprising:

Calculating altitude values h(i, j) of the individual pixels P(i, j) in a geodetic coordinate system using flight condition data of the aircraft;

Evaluating pixel quantity, whereby for each pixel P(i, j) the distance value is compared to a predetermined threshold value or threshold value range and the pixel P(i, j) is given an invalid status if a corresponding distance value is above the threshold value or outside a threshold value range;

Defining in each pixel column j for each pixel P(i, j) of a reference altitude $h_{ref}$ with $h_{ref}$=Min($h_{above}$, $h_{below}$), where $h_{above}$ is an altitude value of that pixel P(i', j) with valid status in the respective pixel column j above measurement pixel P (i, j), which is nearest to the measurement pixel P(i, j) and $h_{below}$ is the altitude value of that pixel P(i'', j) with valid status in a respective pixel column j below the measurement pixel P(i, j) which is closest to the measurement pixel P(i, j);

Evaluating the image-like representation, whereby the distance values of pixels P(i, j) adjacent within one column are compared in each pixel column j of the image-like representation from top to bottom or vice versa and the corresponding pixel P(i, j) is highlighted as a picture element if at least one of the following cases a) through c) is present:

a) the condition ($Rg_{i−1,j}$−$Rg_{i,j}$)>$dRg_{min}$ and ($Rg_{i+1,j}$−$Rg_{i,j}$)>$dRg_{min}$ is fulfilled;

b) the condition is fulfilled that pixel P(i−1,j) is invalid and ($Rg_{i+1,j}$−$Rg_{i,j}$)>$dRg_{min}$;

c) the condition is fulfilled that the adjacent pixels P(i−1, j) above the measurement pixel P(i, j) and the adjacent pixels P(i+1, j) below the measurement pixel P(i, j) have an invalid status and the altitude value h(i, j) of the measurement pixel P(i, j) is greater than the reference altitude $h_{ref}$;

wherein the value $dRg_{min}$ is dependent on the resolution of the sensor used, $Rg_{i,j}$ is the distance value to the measurement pixel P(i, j) and $Rg_{i−1,j}$ and $Rg_{i+1,j}$ are the distance values of the directly adjacent pixels P(i−1, j) and P(i+1, j) in the column j of the distance image.

2. A method according to claim 1 wherein:

not only directly adjacent individual pixels, but also pairs and triples of directly adjacent pixels are observed in the distance image with regard to a measurement pixel, whereby the conditions a)-c) are examined a plurality of times, whereby not only those directly adjacent, but also the next indirectly adjacent and the ones after that are observed as reference pixels.

3. A method according to claim 1, wherein:

the picture element is highlighted by coloring the corresponding picture element in a contrasting or signal color.

4. A method according to claim 1, wherein:

the raw data are directionally linked distance values that are an image of the topography surrounding the aircraft.

5. A method according to claim 1, wherein:

calculating an image-like representation is carried out using the relative position of each raw data point with respect to the location of the sensor from the entire raw data.

* * * * *